US012009598B2

(12) United States Patent
Fang et al.

(10) Patent No.: US 12,009,598 B2
(45) Date of Patent: Jun. 11, 2024

(54) ELECTRONIC DEVICE AND ANTENNA STRUCTURE

(71) Applicant: WISTRON NEWEB CORPORATION, Hsinchu (TW)

(72) Inventors: Ying-Sheng Fang, Hsinchu (TW); Shang-Sian You, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 112 days.

(21) Appl. No.: 18/053,770

(22) Filed: Nov. 9, 2022

(65) Prior Publication Data

US 2023/0335918 A1 Oct. 19, 2023

(30) Foreign Application Priority Data

Apr. 14, 2022 (TW) .................................. 111114142

(51) Int. Cl.

*H01Q 21/06* (2006.01)
*H01Q 1/22* (2006.01)
*H01Q 1/24* (2006.01)
*H01Q 21/00* (2006.01)

(52) U.S. Cl.

CPC ............. *H01Q 21/065* (2013.01); *H01Q 1/22* (2013.01); *H01Q 21/0037* (2013.01)

(58) Field of Classification Search

CPC ........ H01Q 1/22; H01Q 1/2266; H01Q 5/357; H01Q 13/10; H01Q 21/0037; H01Q 21/065

See application file for complete search history.

(56) References Cited

FOREIGN PATENT DOCUMENTS

| | | | | |
|---|---|---|---|---|
| TW | 201935762 A | | 9/2019 | |
| WO | WO-2019117941 A1 | * | 6/2019 | ........... H01Q 1/2266 |

* cited by examiner

*Primary Examiner* — Hoang V Nguyen

(74) *Attorney, Agent, or Firm* — McClure, Qualey & Rodack, LLP

(57) ABSTRACT

An electronic device and an antenna structure are provided. The electronic device includes a metal housing, and the antenna structure is disposed in the metal housing. The antenna structure includes a printed circuit board, two radiating elements, two feeding transmission lines and a connector. The two radiating elements are disposed on the printed circuit board and are close to the two slots. Projections of the two radiating elements projected onto the metal housing at least partially overlap with the two slots. The two feeding transmission line are disposed in the printed circuit board. The two feeding transmission lines are electrically connected to the two radiating elements, respectively, and lengths of the two feeding transmission lines are the same. The connector is connected to the printed circuit board and electrically connected to the two feeding transmission lines.

15 Claims, 8 Drawing Sheets

ELECTRONIC DEVICE AND ANTENNA STRUCTURE

CROSS-REFERENCE TO RELATED PATENT APPLICATION

This application claims the benefit of priority to Taiwan Patent Application No. 111114142, filed on Apr. 14, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna structure, and more particularly to an electronic device having an ultra-wideband band antenna structure.

BACKGROUND OF THE DISCLOSURE

Recently, applications of ultra-wideband (UWB) technology have gradually been popularized. Due to extremely high bandwidth and low power consumption, UWB technology is suitable for indoor ranging and positioning applications. For example, the ultra-wideband technology utilizes two antennas to receive phase information returned from a to-be-detected object for calculation, so as to obtain a position of the to-be-detected object, that is, a phase-difference-of-arrival (PDOA) algorithm.

However, most of the existing UWB antennas are provided in the form of modules, and it can be difficult to put such large modules into consumer electronic products, such as smart phones or notebook computers. In addition, the existing UWB antenna uses coaxial cables for signal feeding. However, in the ultra-broadband frequency band, when the coaxial cables are used for signal feeding, tolerances of the coaxial cables cause a phase difference between the two antennas when the signal is fed, which changes a positioning algorithm to be used and affects an accuracy of the positioning.

Therefore, improving a design of an antenna structure, in a way as to allow the antenna structure to fit inside an electronic device with minimum impact on an appearance of a product and to comply with characteristics of antenna radiation, has become one of the important issues in the art.

SUMMARY OF THE DISCLOSURE

In response to the above-referenced technical inadequacies of large volume of an ultra-wideband antenna and different phases of the fed signals, the present disclosure provides an electronic device and an ultra-wideband antenna structure inside the electronic device.

In one aspect, the present disclosure provides an electronic device. The electronic device includes a metal housing, a printed circuit board, two radiating elements, two feeding transmission lines and a connector. The metal housing has two slots. The printed circuit board disposed in the metal housing. The two radiating elements are disposed on the printed circuit board and are close to the two slots. Projections of the two radiating elements projected onto the metal housing at least partially overlap with the two slots, respectively. The two feeding transmission line are disposed in the printed circuit board. The two feeding transmission lines are electrically connected to the two radiating elements, respectively, and lengths of the two feeding transmission lines are the same. The connector is connected to the printed circuit board and electrically connected to the two feeding transmission lines.

In another aspect, the present disclosure provides an antenna structure. The antenna structure includes a printed circuit board, two radiating elements, two feeding transmission lines and a connector. The two radiating elements are disposed on the printed circuit board and are close to the two slots. Projections of the two radiating elements projected onto the metal housing at least partially overlap with the two slots, respectively. The two feeding transmission line are disposed in the printed circuit board. The two feeding transmission lines are electrically connected to the two radiating elements, respectively, and lengths of the two feeding transmission lines are the same. The connector is connected to the printed circuit board and electrically connected to the two feeding transmission lines.

Therefore, in the electronic device and the antenna structure provided by the present disclosure, the projections of the two radiating elements projected onto the metal housing at least partially overlap with the two slots, respectively, the two feeding transmission lines are electrically connected to the two radiating elements, respectively, and the lengths of the two feeding transmission lines are the same, which can allow the antenna structure to be integrated with the minimum impact on the appearance of products, such as notebook computers, and provide solutions for technical inadequacies of different phases of the fed signals of the existing antennas that utilize coaxial cables in the notebook computers.

These and other aspects of the present disclosure will become apparent from the following description of the embodiment taken in conjunction with the following drawings and their captions, although variations and modifications therein may be affected without departing from the spirit and scope of the novel concepts of the disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
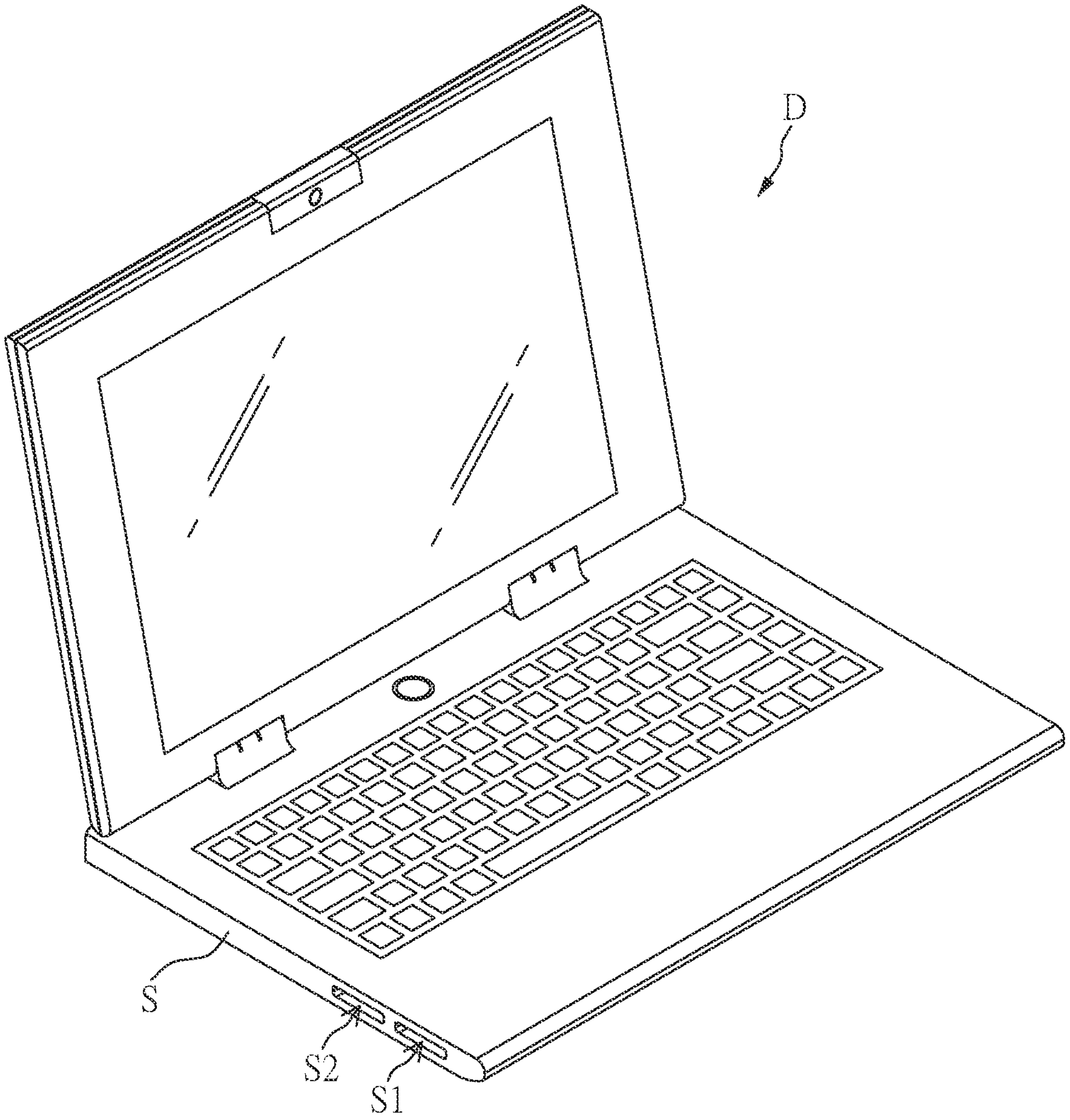
FIG. 1 is a schematic perspective view of an electronic device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements and the two elements are directly or indirectly connected, and the term "couple" or "coupled" in the context of the present disclosure means that two elements are separated and have no physical connection therebetween, but means that an electric field energy generated by one of the two elements excites an electric field energy generated by the other of the two elements.

EMBODIMENTS

Figure 2:
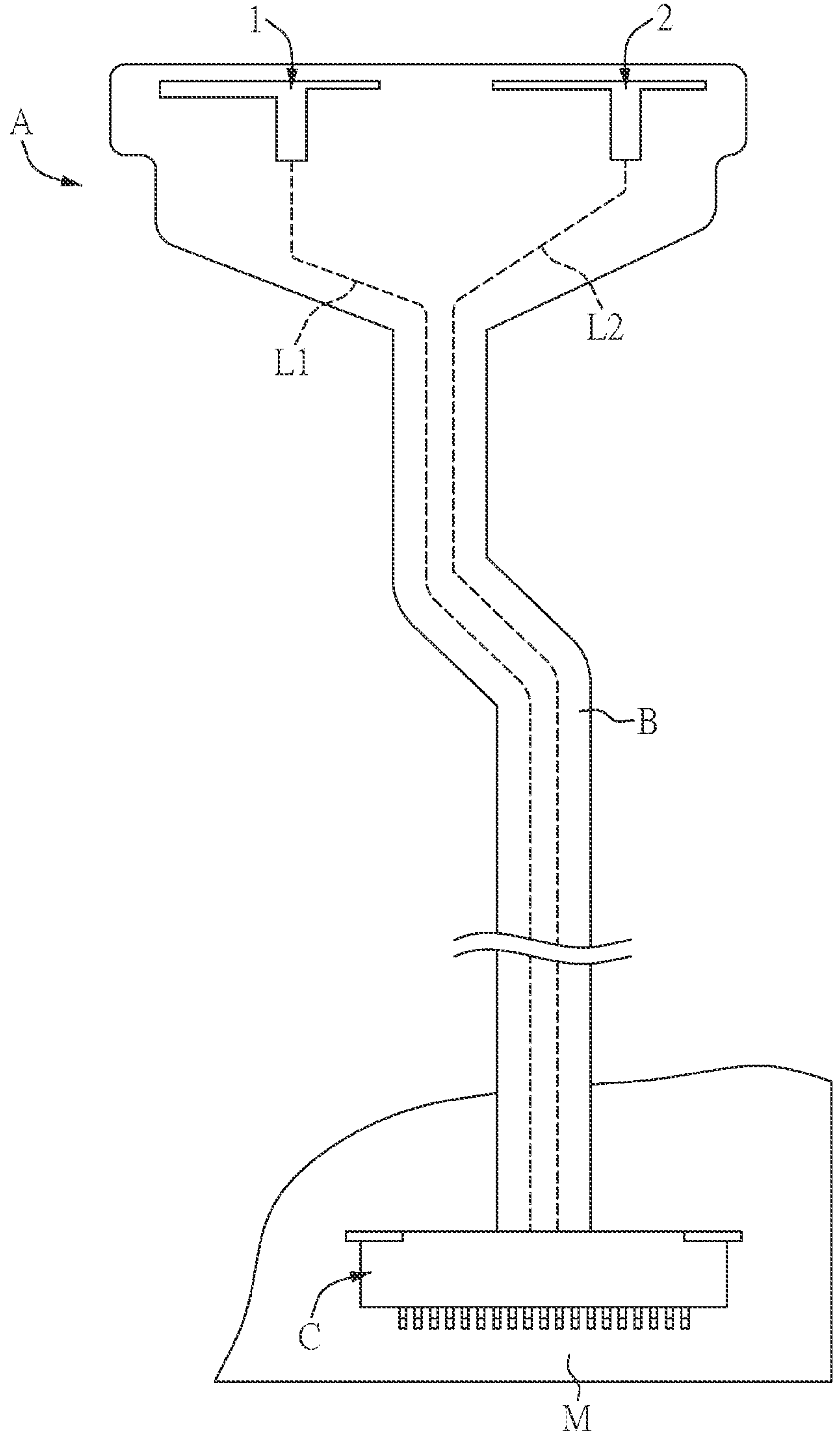
FIG. 2 is a schematic diagram of an antenna structure of the present disclosure.

Reference is made to FIGS. 1 and 2, FIG. 1 is a schematic perspective view of an electronic device of the present disclosure, and FIG. 2 is a schematic diagram of an antenna structure of the present disclosure. The present disclosure provides an electronic device D, which includes a metal housing S and an antenna structure A disposed in the metal housing S. The metal housing S has two slots S1 and S2 with the same size. For example, the electronic device D can be a notebook computer, but the disclosure is not limited thereto.

As shown in FIG. 2, the antenna structure A includes a printed circuit board (PCB) B, two radiating elements, two feeding transmission lines L1 and L2, and a connector C. The printed circuit board B is provided inside the metal housing S. The two radiating elements are disposed on the printed circuit board B. The feeding transmission lines L1 and L2 are disposed in the printed circuit board B, and are electrically connected to the two radiating elements, respectively. For the convenience of description, the two radiating elements can be divided into a first radiating element 1 and a second radiating element 2. The first radiating element 1 is electrically connected to the feeding transmission line L1, and the second radiating element 2 is electrically connected to the feeding transmission line L2. The connector C is connected to the printed circuit board B, and is electrically connected to the feeding transmission lines L1 and L2. For example, the connector can be a radio frequency connector (RF connector) or a wire to board connector, and the present disclosure is not limited thereto. Therefore, the antenna structure A can be connected to another main board M through the connector C, and feed signals to the first radiating element 1 and the second radiating element 2 through the feeding transmission lines L1 and L2, respectively. In addition, for example, the printed circuit board B in the present disclosure is a flexible printed circuit (FPC), and the two feeding transmission lines L1 and L2 designed on the printed circuit board B have about 50Ω of impedance, a material of the printed circuit board B is modified polyimide (MPI) resin, which has a dielectric constant Dk of 2.8, and a dielectric loss factor Df of 0.005. However, a material or material parameters of the printed circuit board is not limited in the present disclosure.

The feeding transmission lines L1 and L2 have the same size in the present disclosure; that is, a length, a width and a height of the feeding transmission line L1 are respectively the same as a length, a width and a height of the feeding transmission line L2. However, it should be noted that since the feeding transmission lines L1 and L2 are formed in a layout of the printed circuit board B, an actual length of each of the feeding transmission lines L1 and L2 has an error range due to errors occurring during manufacturing processes of the printed circuit board B. The above-mentioned "the same sizes" include the error range in the actual manufacturing processes. For example, the error range can be ±0.025%. Compared with the existing antenna using coaxial cables for signal feeding, and tolerances of the coaxial cables causing a phase difference between two antennas when signals are fed, since process tolerances of the feeding transmission lines designed in the PCB is much smaller than process tolerances of the coaxial cables, the present disclosure maintains the lengths of the feeding transmission lines L1 and L2 to be equal by designing the feeding transmission lines L1 and L2 on the printed circuit board B, so as to ensure that phases of the first radiating element 1 and the second radiating element 2 can be approximately the same when signals are fed.

Figure 3:
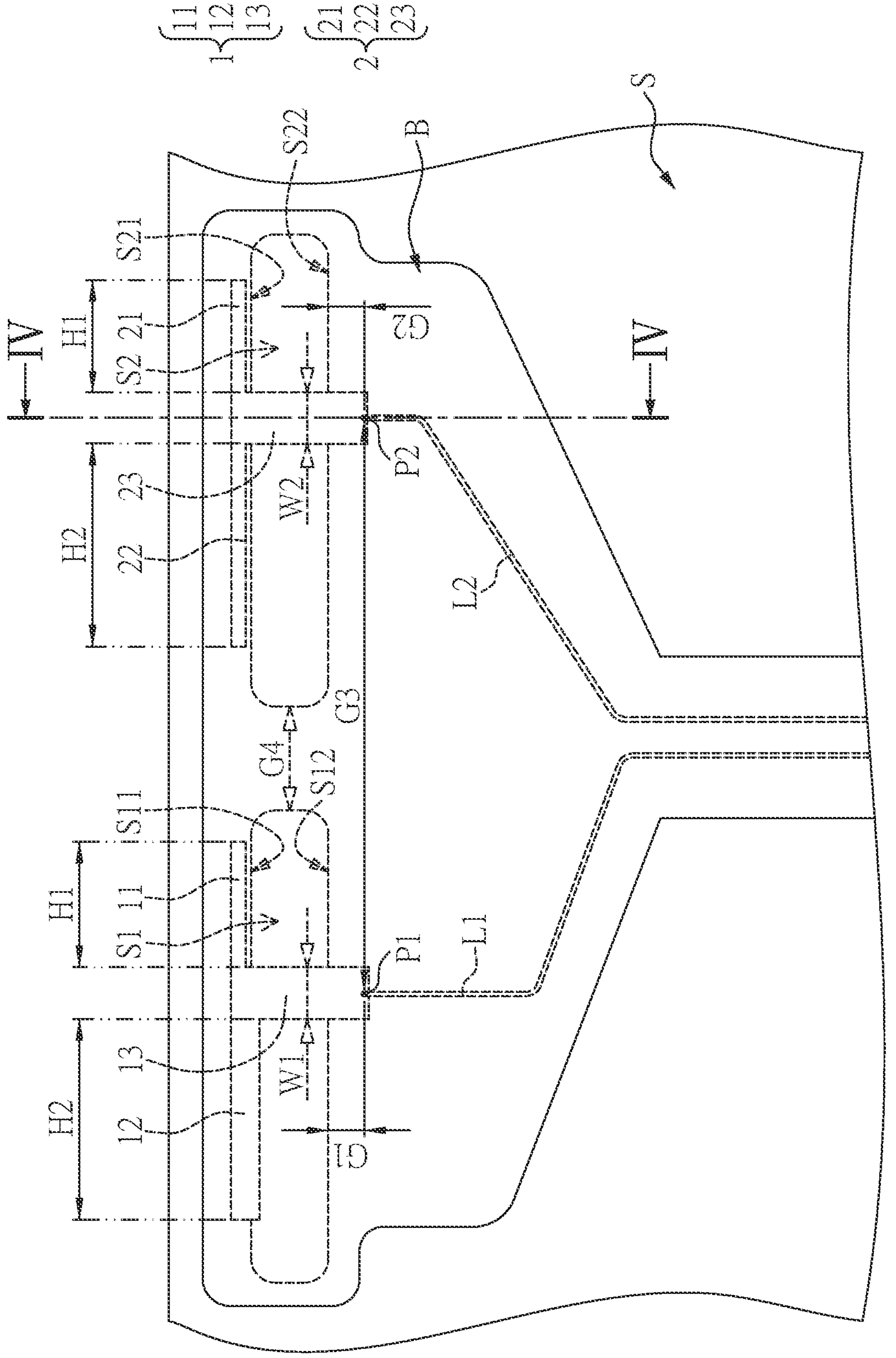
FIG. 3 is a schematic diagram showing relative positions of an antenna structure and slots of the present disclosure.

Referring to FIG. 3, FIG. 3 is a schematic diagram showing relative positions of an antenna structure and slots of the present disclosure. A perspective of FIG. 3 is from the inside of the metal housing S to the outside. The first radiating element 1 and the second radiating element 2 are close to the slots S1 and S2, and the first radiating element 1 corresponds to the slot S1 and the second radiating element 1 corresponds to the slot S2. Projections of the first radiating element 1 and the second radiating element 2 projected onto the metal housing S at least partially overlap with the slots S1 and S2, respectively. Specifically, the first radiating element 1 is a monopole antenna, which includes a first radiating arm 11, a second radiating arm 12 and a feeding arm 13. The feeding arm 13 is connected between the first radiating arm 11 and the second radiating arm 12, the first radiating arm 11 and the second radiating arm 12 respectively extend in opposite directions relative to the feeding arm 13, and a length H1 of the first radiating arm 11 is shorter than a length H2 of the second radiating arm 12. In addition, it is worth mentioning that a first radiating arm 11 and a second radiating arm 12 are arranged along an upper edge S11 of the corresponding slot S1, and a projection of the first radiating arm 11 projected onto the metal housing S does not overlap with the corresponding slot S1, and a projection of a feeding arm 13 projected onto the metal housing S overlaps with and extends across the corresponding slot S1.

As mentioned above, the second radiating element 2 has a similar structure to the first radiating element 1. The second radiating element 2 is also a monopole antenna and has a first radiating arm 21, a second radiating arm 22 and a feeding arm 23. The similarities between the second radiating element 2 and the first radiating element 1 are not repeated herein. In detail, the difference between the second radiating element 2 and the first radiating element 1 in this embodiment is that a projection of the second radiating arm 12 of the radiating element 1 projected onto the metal housing S partially overlaps with the corresponding slot S1, while a projection of the second radiating arm 22 of the second radiating element 2 projected onto the metal housing S does not overlap with the corresponding slot S2. Therefore, structures of the first radiating element 1 and the second radiating element 2 can be completely the same, or there can be certain differences as is the case in the present embodiment. The difference in the structural design depends on the surrounding environment of where the antenna structure A is located; that is, the structure of the antenna structure A can be adjusted according to different environments, and the present disclosure is not limited thereto.

Further, when the feeding transmission line L1 feeds a signal to the first radiating element 1, the feeding arm 13 and the first radiating arm 11 of the first radiating element 1 can be coupled with the slot S1 to generate a first operating frequency band, the feeding arm 13 and the second radiating arm 12 of the first radiating element 1 can be coupled with the slot S1 to generate a second operating frequency band, and the first operating frequency band is higher than the second operating frequency band. For example, the first operating frequency band ranges from 7750 MHz to 8250 MHz, and the second operating frequency band ranges from 6250 MHz to 6750 MHz. Similarly, when the feeding transmission line L2 feeds a signal to the second radiating element 2, the feeding arm 23 and the first radiating arm 21 of the second radiating element 2 can be coupled with the slot S2 to generate a first operating frequency band in a range of 7750 MHz to 8250 MHz, the feeding arm 23 and the second radiating arm 22 of the second radiating element 2 can be coupled to the slot S2 to generate a second operating frequency band in a range of 6250 MHz to 6750 MHz, and the first operating frequency band is higher than the second operating frequency band.

Reference is made to FIG. 3, in which the feeding arm 13 of the first radiating element 1 and the feeding transmission line L1 are connected at an intersection point P1, and the intersection point P1 is separated from a lower edge S12 of the slot S1 by a first distance G1, and the first distance G1 is greater than or equal to 1 mm. Similarly, the feeding arm 23 of the first radiating element 2 and the feeding transmission line L2 are connected at an intersection point P2, the intersection point P2 is separated from the lower edge S22 of the slot S2 by a second distance G2, and the second distance G2 is greater than or equal to 1 mm. In the present disclosure, impedance matching of the first radiating element 1 and the second radiating element 2 can be adjusted through designs of the first distance G1 and the second distance G2, so as to achieve excellent frequency response.

Based on the above, there is a third distance G3 between the intersection points P1 and P2, and the third distance G3 has a length within a range of plus or minus 20% of 0.5 times a wavelength of a center frequency (about 8 GHz) of the first operating frequency band, that is, 18.5 mm±20%. In addition, a height of each of the slots S1 and S2 (i.e., a distance between the upper and lower edges) is about 3 mm, and there is a fourth distance G4 between the slots S1 and S2, and more precisely, there is a fourth distance G4 between adjacent side edges of the slots S1 and S2. The fourth distance G4 is greater than or equal to 2 mm, such that the metal housing S has sufficient mechanical strength while providing the slots.

Figure 4:
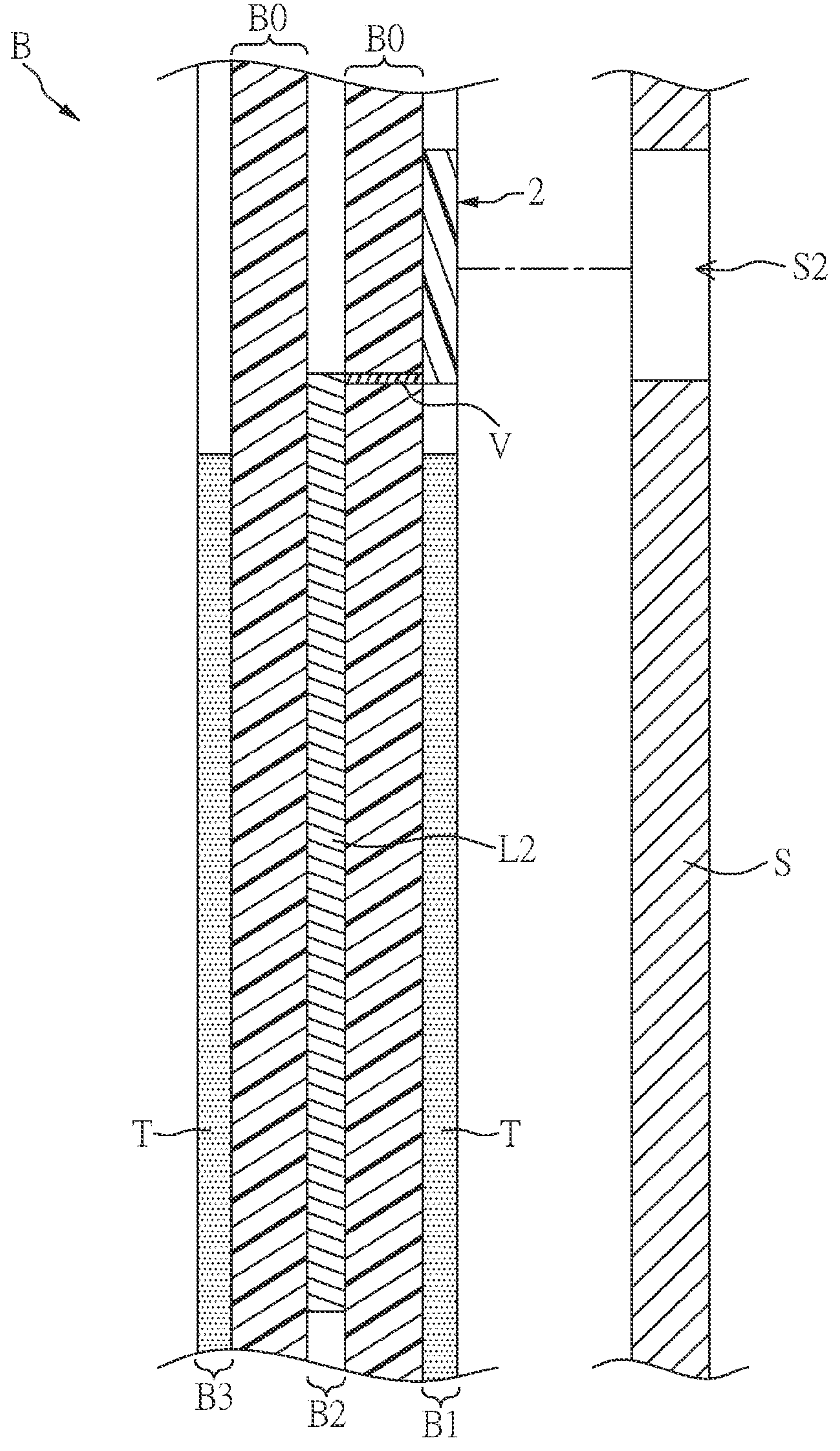
FIG. 4 is a schematic cross-sectional view taken along line IV-IV of FIG. 3.

Reference is made to FIG. 4, which is a schematic cross-sectional view taken along line IV-IV of FIG. 3. In the present disclosure, the printed circuit board B can be a multi-layer board structure, but the present disclosure is not limited thereto. In other embodiments, the printed circuit board B can also be a single-layer board structure. In the present embodiment, the printed circuit board B at least includes a first metal layer B1 and a second metal layer B2, the first metal layer B1 is located on one of the substrates B0, and the second metal layer B2 is located between two adjacent ones of the substrates B0. The first radiating element 1 and the second radiating element 2 are disposed on the first metal layer B1 (the second radiating element 2 is used as an example in FIG. 4). The feeding transmission lines L1 and L2 can be arranged in the first metal layer B1 or the second metal layer B2. In this embodiment, the feeding transmission lines L1 and L2 are arranged in the second metal layer B2 (in FIG. 4, the transmission line L2 is used as an example), so as to reduce interferences and influences of surrounding environment, but the present disclosure is not limited thereto. In addition, it should be noted that the printed circuit board B in this embodiment can further include a third metal layer B3, and the third metal layer B3 is located in another substrate B0, that is, the printed circuit board B is a three-layer board structure including the first metal layer B1, the second metal layer B2 and the third metal layer B3. In addition, the feeding transmission lines L1 and L2 can be electrically connected to the first radiating element 1 and the second radiating element 2 through conductive vias V, respectively. For example, the second radiating element 2 in FIG. 4 is electrically connected to the feeding transmission line L2 through the conductive vias V. The first metal layer B1 and the third metal layer B3 each have a ground region T, such that the antenna structure A can be grounded by contacting the metal casing S through the ground region T.

Reference is made to FIG. 4, in which a first metal layer B1 is closer to the slots S1 and S2 than the second metal layer B2, thus the first radiating element 1 and the second radiating element 2 can be as close to the slots S1 and S2 as possible, thereby coupling the slots S1 and S2 to generate the first operating frequency band and the second operating frequency band.

Reference is made to FIG. 3, in which the first radiating element 1 can be disposed along the upper edge S11 of the corresponding slot S1 through the first radiating arm 11 and the second radiating arm 12, so as to achieve excellent frequency response and to generate the first operating frequency band in the range of 7750 MHz to 8250 MHz and the second operating frequency band in the range of 6250 MHz to 6750 MHz, and the second radiating element 2 has a similar configuration. Further, the first radiating element 1 and the second radiating element 2 can adjust the impedance matchings at high and low frequencies through widths W1 and W2 of the feeding arms 13 and 23, respectively. In addition, the first radiating element 1 and the second radiating element 2 can also adjust impedance matching at a high frequency (that is, the first operating frequency band) respectively through designs where the projections of the first radiating arm 11 and 21 projected onto the metal housing S do not overlap with the corresponding slots S1 and S2.

Figure 5:
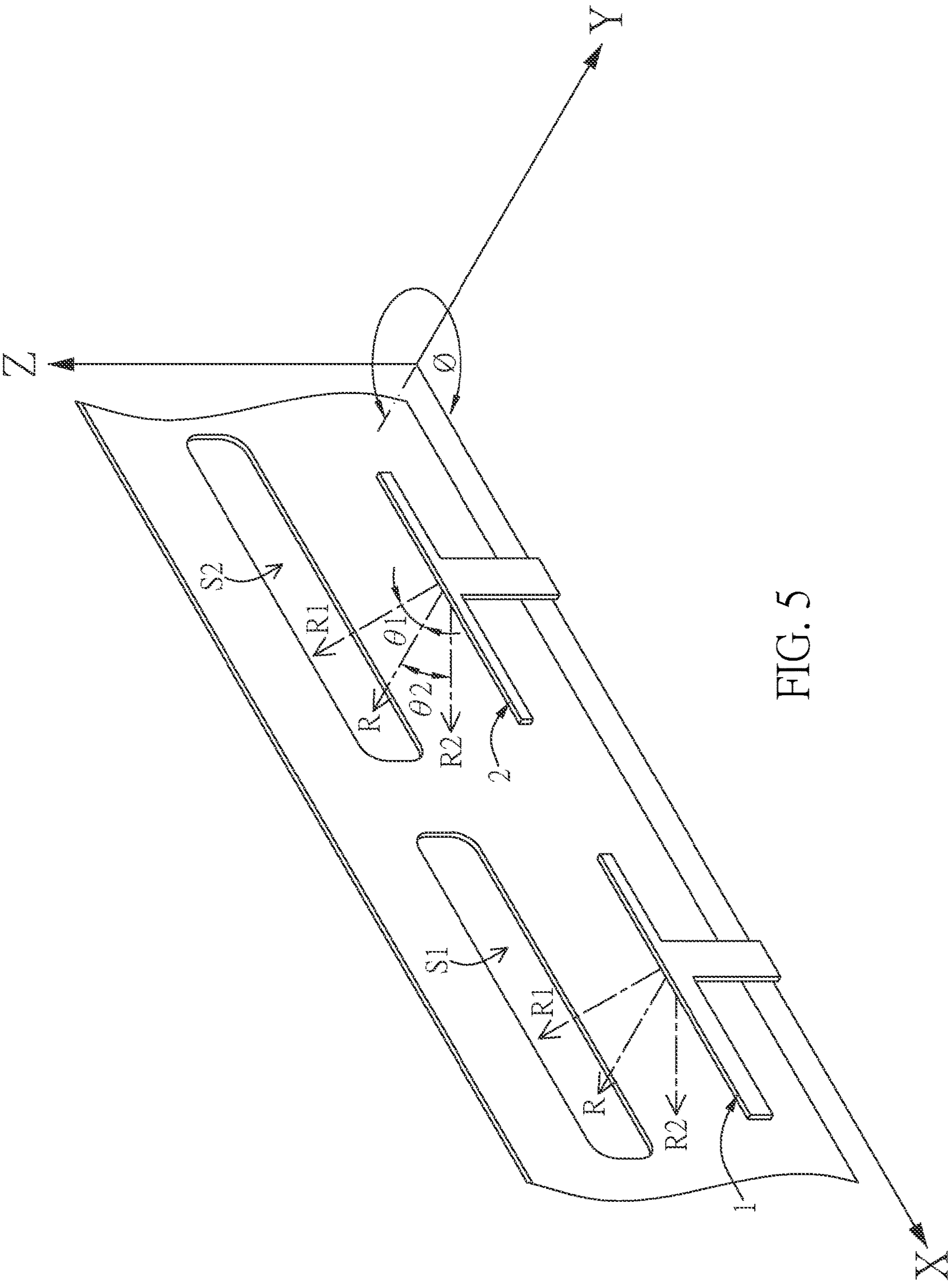
FIG. 5 is a schematic diagram showing a radiation direction of the antenna structure of the present disclosure.
Figure 6:
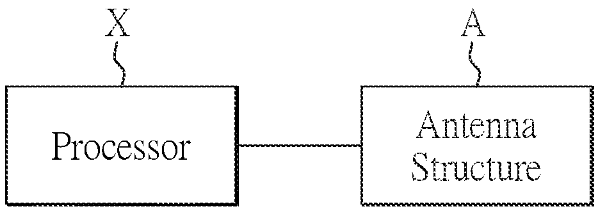
FIG. 6 is a functional block diagram of an antenna structure and a processor of the present disclosure.

Referring to FIGS. 5 and 6, FIG. 5 is a schematic diagram showing a radiation direction of the antenna structure of the present disclosure, and FIG. 6 is a functional block diagram of an antenna structure and a processor of the present disclosure. When the first radiating element 1 and the second radiating element 2 respectively perform signal feeding, a radiation wave are generated for each of the first radiating element 1 and the second radiating element 2, and the radiation wave has a radiation pattern having a radiation azimuth Ø that faces the corresponding slot. Since the first radiating element 1 and the second radiating element 2 in the present disclosure have similar structural shapes, radiation patterns generated by the first radiating element 1 and the second radiating element 2 are also similar or even the same. Taking the first radiating element 1 in FIG. 5 as an example, the radiation pattern generated by the first radiating element 1 has a radiation direction R located in XY plane at a position facing the slot S1, and an angle between the radiation direction R and X axis is the radiation azimuth Ø.

As mentioned above, since a range of the operating frequency generated by the antenna structure A of the present disclosure is in the ultra-broadband frequency band, indoor ranging and positioning applications can be performed through the first radiating element 1 and the second radiating element 2. For example, when the radiation wave generated by the first radiating element 1 is emitted through the slot S1, the radiation wave hits a to-be-detected object and a reflected wave is generated, and the reflected wave returns to the first radiating element 1 and the second radiating element 2. The electronic device D further includes a processor X for processing signals received by the first radiating element 1 and the second radiating element 2. Therefore, the processor can calculate a phase difference between the first radiating element 1 and the second radiating element 2 through the reflected waves, and can further calculate a position of the to-be-detected object.

However, the above method requires that each phase difference calculated by the processor X through the first radiating element 1 and the second radiating element 2 must correspond to an individual radiation azimuth Ø, so as to ensure that a misjudgment does not occur in determining the position of the to-be-detected object by using the phase difference. Therefore, if each phase difference read by the first radiating element 1 and the second radiating element 2 corresponds to multiple radiation azimuths Ø, the processor X cannot correctly determine an azimuth of the to-be-detected object.

Based on the above, in order to for each phase difference received by the first radiating element 1 and the second radiating element 2 to correspond to a single radiation azimuth Ø, the present disclosure maintains the radiation azimuth Ø within a set range, such that angles are linearly related to returned values of phase differences read from the radiating element 1 and the second radiating element 2 within the set range, thereby ensuring that each phase difference received by the first radiating element 1 and the second radiating element 2 corresponds to only one radiation azimuth Ø. Specifically, the set range is 120 degrees. As shown in FIG. 5, the radiation direction R has a first limit R1 and a second limit R2 on both sides of the set range, there is a first angle θ1 between the radiation direction R and the first limit R1, and a second angle θ2 between the radiation direction R and the second limit R2. The angle θ1 and the angle θ2 are both 60 degrees, that is, a range from plus 60 degrees to minus 60 degrees with respect to the radiation direction R is the set range.

Figure 7:
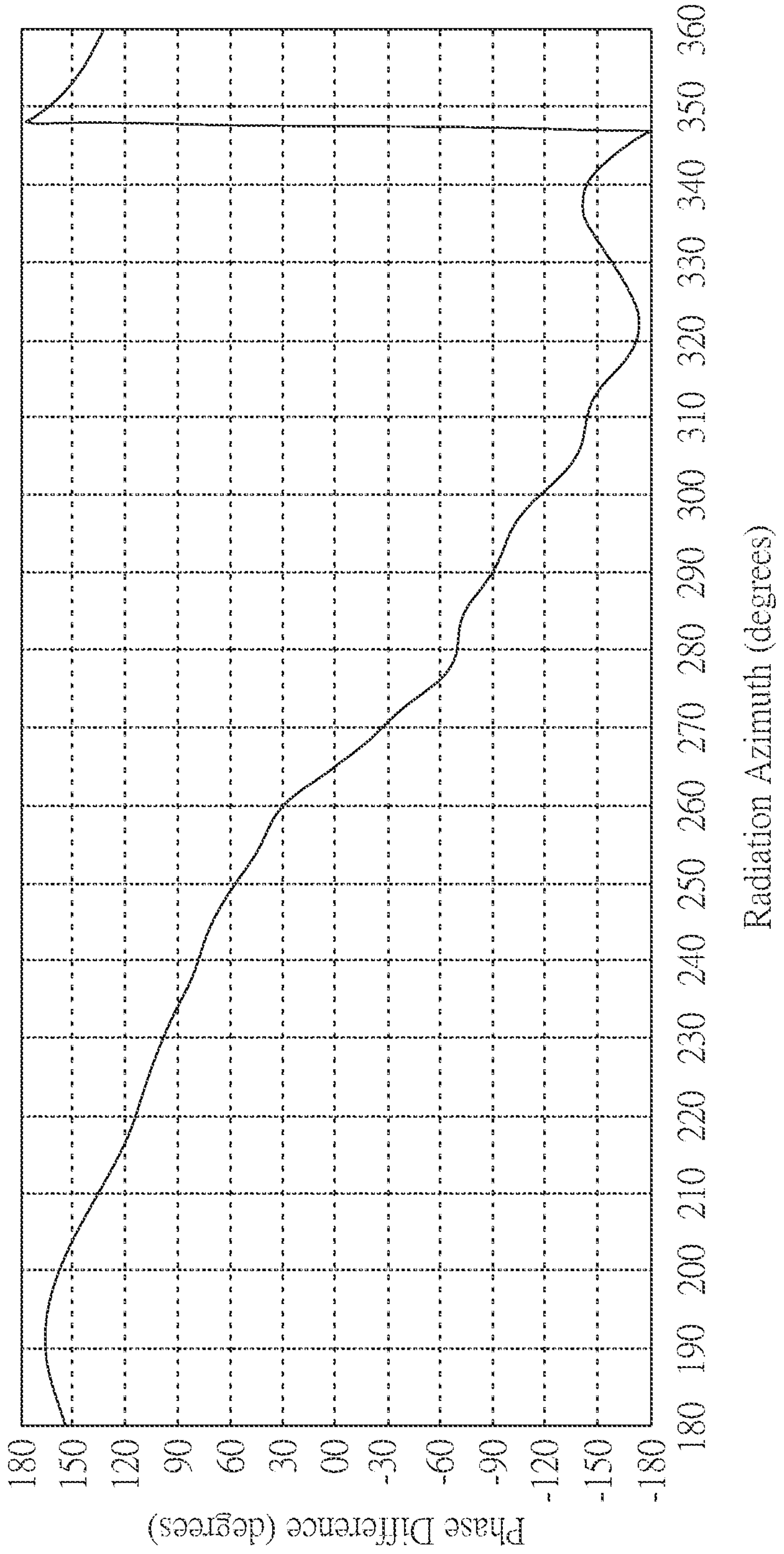
FIG. 7 is a graph showing an antenna phase difference and a radiation azimuth on X-Y plane of a first operating frequency band of an antenna structure of the present disclosure.
Figure 8:
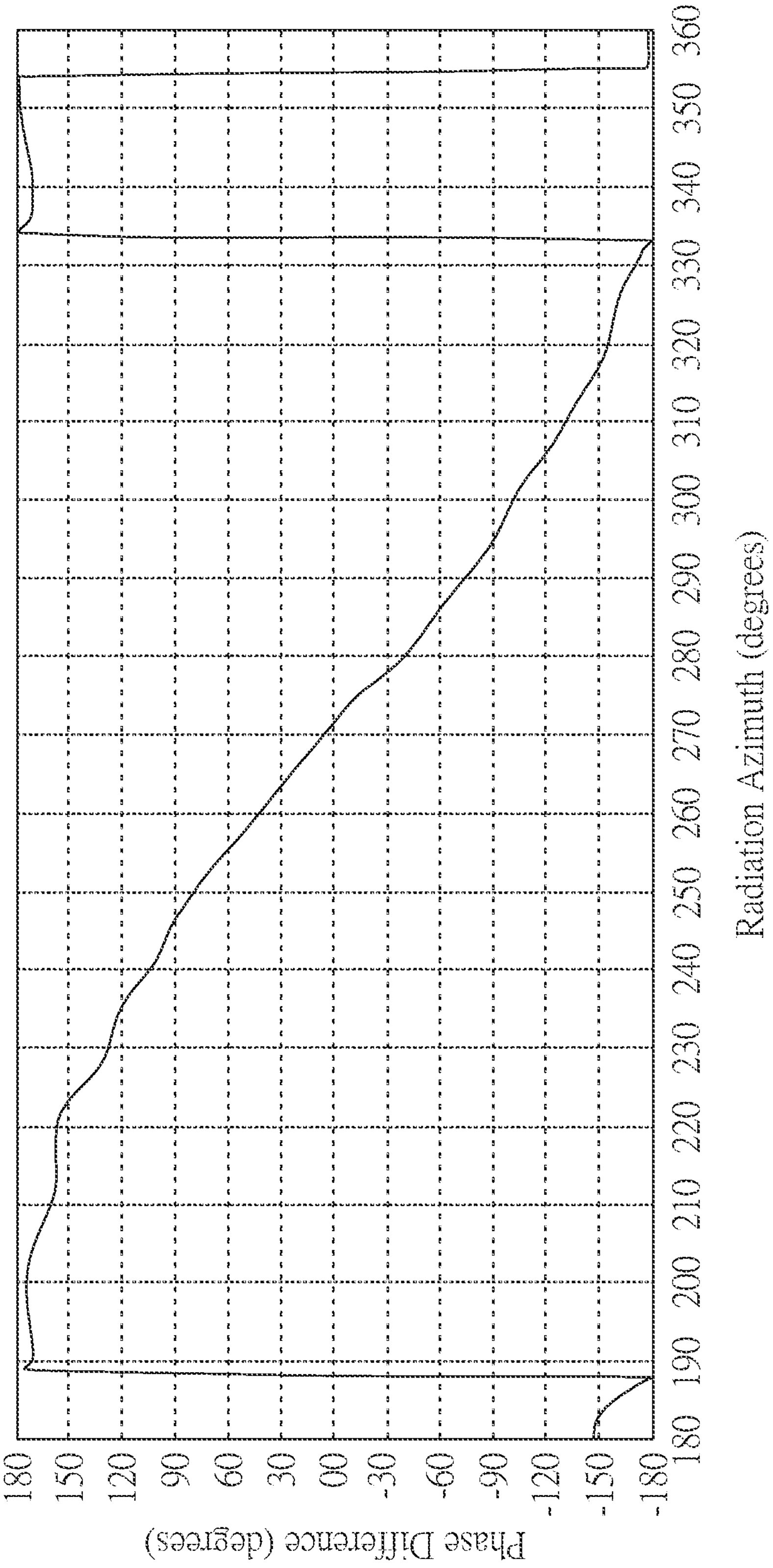
FIG. 8 is a graph showing an antenna phase difference and a radiation azimuth on X-Y plane of a second operating frequency band of an antenna structure of the present disclosure.

Referring to FIGS. 5, 7 and 8, FIG. 7 is a graph showing an antenna phase difference and a radiation azimuth on X-Y plane of a first operating frequency band of an antenna structure of the present disclosure, and FIG. 8 is a graph showing an antenna phase difference and a radiation azimuth on X-Y plane of a second operating frequency band of an antenna structure of the present disclosure. If the metal housing S having the slots S1 and S2, the first radiating element 1 and the second radiating element 2 are arranged on XZ plane, the radiation azimuth Ø of the radiation direction R in FIG. 5 is about 270 degrees. Then, as shown in FIG. 7, in the second operating frequency band (6250 MHz to 6750 MHz) of the antenna structure A of the present disclosure, the radiation azimuth Ø is about 200° to 320°, and the radiation azimuth Ø and a return phase difference are linearly related. As shown in FIG. 8, in the first operating frequency band (7750 MHz to 8250 MHz) of the antenna structure A of the present disclosure, the radiation azimuth Ø of the antenna structure A is linearly related to the return phase difference in a range from about 210 degrees to 330 degrees.

Beneficial Effects of the Embodiments

In conclusion, in the electronic device D and the antenna structure A provided by the present disclosure, the projections of the two radiating elements projected onto the metal housing at least partially overlap with the two slots, respectively, the two feeding transmission lines are electrically connected to the two radiating elements, respectively, and the lengths of the two feeding transmission lines are the same, which can allow the antenna structure to be integrated with minimum impact on the appearance of products, and provide solutions for technical inadequacies of different phases of the fed signals of the existing antennas that utilize coaxial cables in the notebook computers.

Furthermore, compared with the existing antenna using coaxial cables for signal feeding, and tolerances of the coaxial cables causing a phase difference between two antennas when signals are fed, the present disclosure maintains the lengths of the feeding transmission lines L1 and L2 being equal by designing the feeding transmission lines L1 and L2 on the printed circuit board B, so as to ensure that phases of the first radiating element 1 and the second radiating element 2 can be approximately the same when signals are fed.

Furthermore, the first radiating element 1 can be disposed along the upper edge S11 of the corresponding slot S1 through the first radiating arm 11 and the second radiating arm 12, and the first radiating element 2 can be disposed along the upper edge S12 of the corresponding slot S2 through the first radiating arm 21 and the second radiating arm 22, so as to achieve excellent frequency response and to generate the first operating frequency band in the range of 7750 MHz to 8250 MHz and the second operating frequency band in the range of 6250 MHz to 6750 MHz. The first radiating element 1 and the second radiating element 2 can adjust the impedance matchings at high and low frequencies through widths W1 and W2 of the feeding arms 13 and 23, respectively. In addition, the first radiating element 1 and the second radiating element 2 can also adjust impedance matching at a high frequency (that is, the first operating frequency band) respectively through designs where the projections of the first radiating arm 11 and 21 projected onto the metal housing S do not overlap with the corresponding slots S1 and S2. In addition, in the present disclosure, the distance between the intersection points P1 and P2 has a length within a range of plus or minus 20% of 0.5 times a wavelength of a center frequency (about 8 GHz) of the first operating frequency band, such that the first radiating element 1 and the second radiating element 2 have excellent phase difference performance when the signals are fed.

Furthermore, in the present disclosure, the structures of the first radiating element 1 and the second radiating element 2 are similar in design for generating similar radiation patterns, and the radiation azimuth Ø is maintained within a set range, such that angles are linearly related to returned values of phase differences read from the radiating element 1 and the second radiating element 2 within the set range, thereby ensuring that each phase difference received by the first radiating element 1 and the second radiating element 2 corresponds to only one radiation azimuth Ø.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a metal housing having two slots;

a printed circuit board disposed in the metal housing;

two radiating elements disposed on the printed circuit board and being close to the two slots, wherein projections of the two radiating elements projected onto the metal housing at least partially overlap with the two slots, respectively;

two feeding transmission lines disposed in the printed circuit board and electrically connected to the two radiating elements, respectively, wherein lengths of the two feeding transmission lines are the same; and a connector connected to the printed circuit board and electrically connected to the two feeding transmission lines.

2. The electronic device according to claim 1, wherein the two radiating elements are monopole antennas, each of the radiating elements includes a first radiating arm, a second radiating arm and a feeding arm, the feeding arm is connected between the first radiating arm and the second radiating arm, the first radiating arm and the second radiating arm are arranged along an upper edge of the corresponding slot, and a length of the first radiating arm is shorter than a length of the second radiating arm.

3. The electronic device according to claim 2, wherein a projection of the first radiating arm projected onto the metal housing does not overlap with the corresponding slot, and a projection of the feeding arm projected onto the metal housing overlaps with and extends across the corresponding slot.

4. The electronic device according to claim 2, wherein the feeding arm of one of the radiating elements and the feeding transmission line corresponding to the one of the radiating elements are connected at an intersection point, and the intersection point is separated from a lower edge of the slot corresponding to the one of the radiating elements by a first distance; and wherein the feeding arm of another one of the radiating elements and the feeding transmission line corresponding to the another one of the radiating elements are connected at another intersection point, the another intersection point is spaced apart from an lower edge of the slot corresponding to the another one of the radiating elements by a second distance, and the first distance and the second distance are greater than or equal to 1 mm.

5. The electronic device according to claim 4, wherein the feeding arm and the first radiating arm of each of the radiating elements are used for being coupled to the corresponding slot to generate a first operating frequency band, the feeding arm and the second radiating arm of each of the radiating elements are used for being coupled to the corresponding slot to generate a second operating frequency band, and the first operating frequency band is higher than the second operating frequency band.

6. The electronic device of claim 5, wherein a third distance between the two intersection points has a length within a range of plus or minus 20% of 0.5 times a wavelength of a center frequency of the first operating frequency band.

7. The electronic device of claim 1, wherein a fourth distance between the two slots is greater than or equal to 2 mm.

8. The electronic device according to claim 1, wherein the printed circuit board includes a multi-layer board structure, and the multi-layer board structure at least includes a first metal layer and a second metal layer, the two radiating elements are disposed in the first metal layer, and the first metal layer is closer to the two slots than the second metal layer, and the two feeding transmission lines are disposed in the first metal layer or the second metal layer.

9. The electronic device according to claim 1, wherein each of the radiating elements is used to generate a radiation pattern having a radiation azimuth facing the corresponding slot, the radiation azimuth has a set range, signal transmissions between the two radiating elements and a to-be-detected object have a phase difference, and the phase difference has a linear relationship with an angle of the radiation azimuth within the set range.

10. An antenna structure disposed in a metal housing having two slots, the antenna structure comprising:

a printed circuit board;

two radiating elements disposed on the printed circuit board and being close to the two slots, wherein projections of the two radiating elements projected onto the metal housing at least partially overlap with the two slots, respectively;

two feeding transmission lines disposed in the printed circuit board and electrically connected to the two radiating elements, respectively, wherein lengths of the two feeding transmission lines are the same; and a connector connected to the printed circuit board and electrically connected to the two feeding transmission lines.

11. The antenna structure according to claim 10, wherein the two radiating elements are monopole antennas, each of the radiating elements includes a first radiating arm, a second radiating arm and a feeding arm, the feeding arm is connected between the first radiating arm and the second radiating arm, the first radiating arm and the second radiating arm are arranged along an upper edge of the corresponding slot, and a length of the first radiating arm is shorter than a length of the second radiating arm.

12. The antenna structure according to claim 11, wherein the feeding arm and the first radiating arm of each of the radiating elements are used to for being coupled to the corresponding slot to generate a first operating frequency band, the feeding arm and the second radiating arm of each of the radiating elements are used to for being coupled to the corresponding slot to generate a second operating frequency band, and the first operating frequency band is higher than the second operating frequency band.

13. The antenna structure of claim 12, wherein the feeding arm of each of the radiating elements and the corresponding feeding transmission line are connected at an intersection point, and a distance between the two intersection points has a length within a range of plus or minus 20% of 0.5 times a wavelength of a center frequency of the first operating frequency band.

14. The antenna structure according to claim 10, wherein the printed circuit board includes a multi-layer board structure, and the multi-layer board structure at least includes a first metal layer and a second metal layer, the two radiating elements are disposed in the first metal layer, and the first metal layer is closer to the two slots than the second metal layer, and the two feeding transmission lines are disposed in the first metal layer or the second metal layer.

15. The antenna structure of claim 10, wherein each of the radiating elements is used to generate a radiation pattern having a radiation azimuth facing the corresponding slot, the radiation azimuth has a set range, signal transmissions between the two radiating elements and a to-be-detected object have a phase difference, and the phase difference has a linear relationship with an angle of the radiation azimuth within the set range.

* * * * *